United States Patent
Bai et al.

(10) Patent No.: US 7,769,077 B2
(45) Date of Patent: Aug. 3, 2010

(54) DIVERSITY TRANSMITTER-RECEIVER IN CDMA SYSTEM USING SPACE-TIME CODE, AND METHOD THEREOF

(75) Inventors: Dong-Woon Bai, Daejeon (KR); Woo-Yong Lee, Dae-jeon (KR); Hyun-Seo Oh, Dae-jeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 968 days.

(21) Appl. No.: 10/593,011

(22) PCT Filed: Dec. 21, 2004

(86) PCT No.: PCT/KR2004/003385
§ 371 (c)(1),
(2), (4) Date: Sep. 18, 2006

(87) PCT Pub. No.: WO2005/088862
PCT Pub. Date: Sep. 22, 2005

(65) Prior Publication Data
US 2009/0207890 A1    Aug. 20, 2009

(30) Foreign Application Priority Data
Mar. 18, 2004    (KR) ............. 10-2004-0018330

(51) Int. Cl.
H04B 1/00    (2006.01)
(52) U.S. Cl. .................................... 375/146
(58) Field of Classification Search ............. 375/135, 375/140, 146, 265, 267, 299, 347, 349; 700/53; 455/101, 132–141; 704/242; 714/792
See application file for complete search history.

(56) References Cited

U.S. PATENT DOCUMENTS
6,115,427 A    9/2000    Calderbank et al.
(Continued)

FOREIGN PATENT DOCUMENTS
KR    1020030038289    5/2003
(Continued)

OTHER PUBLICATIONS

Tarokh, Vahid, et al., "Space-Time Codes for High Data Rate Wireless Communication: Performance Criterion and Code Construction", Mar. 1998, IEEE Transactions on Information Theory, vol. 44, No. 2.

(Continued)

Primary Examiner—Sam K Ahn
(74) Attorney, Agent, or Firm—Ladas & Parry LLP

(57) ABSTRACT

A diversity transmitting/receiving apparatus and method is provided, which is implemented using space-time trellis codes (STTC) constructed from a Pseudo Noise (PN) sequence set in a Direct Sequence (DS) CDMA system. The transmitter comprises a PN sequence generator, a space-time encoder, first and second modulators, and first and second multiple transmit antennas. The space-time encoder selects two of the multiple PN sequences to construct STTC, and space-time encodes data from a data source according to the STTC to output an Wary data symbol. The two modulators modulate the space-time encoded data according to the STTC. The two multiple transmit antennas wirelessly transmit outputs of the two modulators, respectively. By applying a method using space-time coding in a DS CDMA system including multiple transmit antennas, it is possible to achieve both diversity and additional coding gain and also to reduce multiple user interference by increasing the PN sequence length.

11 Claims, 10 Drawing Sheets

U.S. PATENT DOCUMENTS

| | | | |
|---|---|---|---|
| 6,452,916 B1 * | 9/2002 | Hochwald et al. | 370/342 |
| 6,515,978 B1 | 2/2003 | Buehrer et al. | |
| 6,542,556 B1 * | 4/2003 | Kuchi et al. | 375/299 |
| 6,889,355 B1 * | 5/2005 | Calderbank et al. | 714/792 |
| 7,324,482 B2 * | 1/2008 | Hammons et al. | 370/334 |
| 2004/0057530 A1 * | 3/2004 | Tarokh et al. | 375/267 |
| 2004/0146014 A1 * | 7/2004 | Hammons et al. | 370/320 |

FOREIGN PATENT DOCUMENTS

| | | |
|---|---|---|
| WO | WO0243313 | 5/2002 |
| WO | WO03088503 | 10/2003 |
| WO | WO03092206 | 11/2003 |

OTHER PUBLICATIONS

Choe, S., "Space-Time Trellis-Codes for High Rate Wireless CDMA Systems", Mar. 20, 2003, *Electronics Letters*, vol. 39, No. 6.

* cited by examiner

DIVERSITY TRANSMITTER-RECEIVER IN CDMA SYSTEM USING SPACE-TIME CODE, AND METHOD THEREOF

TECHNICAL FIELD

The present invention relates to a diversity transmitting/receiving apparatus and method in a Code Division Multiple Access (CDMA) system using space-time codes, and more particularly to a diversity transmitting/receiving apparatus and method which is implemented using Space-Time Trellis Codes (STTC) constructed from a set of Pseudo Noise (PN) sequences in a Direct Sequence Code Division Multiple Access (DS/CDMA) system.

BACKGROUND ART

In wireless transmission systems, diversity is a technique that provides a number of independent signals to reduce signal distortion caused by fading. For example, the diversity is achieved through a number of receive antennas in an uplink communication, and the same is achieved through multiple transmit antennas in a downlink communication.

V. Tarokh has proposed a method for achieving diversity using space-time codes, which can achieve diversity and coding gain through trellis encoding without increasing the bandwidth, and can increase system performance gain by efficiently taking advantage of error correcting codes and diversity transmission.

The method is described in an article entitled "Space-Time Codes for High Data Rate Wireless Communication: Performance Criterion and Code Construction," IEEE Transactions On Information Theory, Vol. 44, No. 2, P. 744 to 795, March 1998.

This prior art has proposed a method for achieving diversity gain in multiple transmit antennas using the same bandwidth as a single transmit antenna (i.e., without increasing the bandwidth) in a narrow-band fast mobile communication system. This prior art has established general rules, which can incorporate conventional diversity methods, and verified the general rules through a method using trellis coding, and also proposed a method for achieving diversity in multiple transmit antennas according to the general rules.

This prior art has suggested rules and examples of a type of encoding in which signal points, which are resources available in narrow bands, can be suitably associated with a number of transmit antennas, thereby suggesting the possibility that various transmission diversity methods can be provided, and theoretical background supporting the possibility. However, this prior art has suggested only the possibility that transmission diversity can be achieved using space-time codes that are constructed with dense signal constellations under the assumption of narrow band communication, and theoretical background supporting the possibility.

In addition, V. Tarokh and S. M. Alamouti have proposed a method using Space-Time Block Codes (STBC), which can achieve transmission diversity more easily than the method using Space-Time Trellis Codes (STTC). However, this method has problems in that it is difficult to obtain additional coding gain and it inevitably increases the bandwidth when more than 2 transmit antennas is used.

Also, studies have been carried out on a method for achieving transmission diversity in Code Division Multiple Access (CDMA) mobile communication using space-time codes. The simplest method for achieving transmission diversity in the CDMA mobile communication is to transmit signals to users after spreading the signals using spreading codes in respective transmit antennas. However, since a single spreading code must be assigned to each of the transmit antennas of the users, this method has a disadvantage in that the number of supportable users is reduced by a factor of the number of transmit antennas when orthogonal spreading codes are used or when the number of spreading codes is limited.

For example, under the assumption that M transmit antennas are provided for each user, it is possible to achieve M-fold diversity without using space-time codes when M spreading codes are assigned to each user. However, this method has a problem in that, when M spreading codes are assigned to each user and the total number of codes is limited, the number of supportable users is $M^{-1}$ times smaller than that when only one transmit antenna is used.

One method to overcome this problem is to achieve transmission diversity in the CDMA mobile communication using Alamouti's codes or other space-time block codes.

The conventional method of achieving transmission diversity using space-time codes in CDMA transmission is associated with a method that uses spreading code sequences in CDMA wireless transmission, and more particularly with a method that transmits encoded messages in downlink for more secure transmission using multiple transmit antennas in the transmitter under a fading environment.

In this method, data symbol sets are transmitted to the users of one or more user groups, and a set of spreading code sequences, which is called a "code group", is assigned to each of the user groups. Each of the data symbol sets is transmitted in the form of two or more signal sequences to the users of a given user group. Each of the signal sequences is transmitted through a corresponding one of two or more antennas. Here, each signal sequence is a linear combination of spreading code sequences belonging to the corresponding code group. In the linear combination of spreading code sequences, each spreading code sequence has a scalar coefficient, which is a linear combination of pertinent data symbols (for example, data symbols to be transmitted to users in a given user group) or of complex conjugates of pertinent data symbols.

Specifically, one method for achieving transmission diversity using space-time codes in CDMA transmission was disclosed in U.S. Pat. No. 6,452,916 (Sep. 17, 2002), entitled "Space-time spreading method of CDMA wireless communication".

This patent provides a method that can accommodate the same maximum number of users as when one antenna is used with a limited total of spreading codes. Since this method uses the spreading code domain, assigned to other users of the user group, rather than the time domain, it can be considered a method employing the conventional space-time block codes. Although it is possible to accommodate the same number of users while achieving transmission diversity without increasing the total number of spreading codes, the method of U.S. Pat. No. 6,452,916 is disadvantageous in that a mobile station must know spreading codes of the other users in each group.

One conventional method for achieving transmission diversity in CDMA mobile communication will now be described in detail with reference to FIGS. 1 and 2.

FIG. 1 is a block diagram of a conventional diversity transmitter, and FIG. 2 is a block diagram of a conventional diversity receiver.

As shown in FIG. 1, the conventional diversity transmitter includes a data source 110, a plurality of multipliers 120-1, 120-2, ..., and 120-n, a plurality of modulators 130-1, 130-2, ..., and 130-n, and a plurality of antennas 140-1, 140-2, ..., and 140-n. In FIG. 1, $C^1$ to $C^n$ denote spreading code sequences used in the transmitter.

As shown in FIG. 2, the conventional diversity receiver includes a plurality of antennas 210-1, 210-2, ..., and 210-3, a plurality of demodulation devices 220, 230, and 240, a combiner 250, and a band pass filter 260. Each of the plurality of demodulation devices 220, 230, and 240 may include a demodulator 221, a plurality of first multipliers 222-1, 222-2, ..., and 222-$n$, a plurality of accumulators 223-1, 223-2, ..., and 223-$n$, a plurality of second multipliers 224-1, 224-2, ..., and 224-$n$, a plurality of real part selectors 225-1, 225-2, ..., 225-$n$, and a third multiplier 226. In FIG. 2, $C^{1*}$, $C^{2*}$, ..., and $C^{n*}$ denote complex conjugates of the spreading code sequences $C^1$, $C^2$, ..., and $C^n$, which are used in the receiver, and $\alpha^{1,1*}$, $\alpha^{2,1*}$, ..., and $\alpha^{n,1*}$ denote complex conjugates of the path gains, which are used in the receiver.

Referring to FIG. 1, to increase the data transfer rate, conventional space-time coding must use a relatively dense modulation method.

Also, there has been proposed a method in which space-time block codes are used in the spreading code domain rather than the time domain. In this method, users are divided into groups, and each of the groups is assigned the same number of orthogonal spreading codes as the number of users in the group. A signal to be transmitted to each user in a group is encoded together with signals to be transmitted to the other users in the group. Although this method is disadvantageous in that each user must know all spreading codes used in its group, this method does not require additional spreading codes for each base station and can also achieve transmission diversity without time delay.

When the above method, which achieves transmission diversity using space-time block codes in the spreading code domain rather than in the time domain as described above, is extended by introducing a transmission matrix to the method, it is possible to much more generalize the method such that transmission diversity is achieved using Walsh codes, which are orthogonal spreading codes, without dividing the users into groups.

Specifically, one diversity method, which uses both space-time block codes and Walsh codes in downlink communication in a CDMA system, was disclosed in U.S. Pat. No. 6,515,978 (Feb. 4, 2003), entitled "Methods and apparatus for downlink diversity in CDMA using Walsh codes".

Since this method uses the Walsh code domain rather than the time domain to achieve CDMA downlink diversity, it can be considered a method employing the conventional space-time block codes. Channels divided according to Walsh codes can be regarded as being identical to channels obtained by varying the time or frequency. The method of U.S. Pat. No. 6,515,978 has suggested an example of downlink diversity which can be achieved when orthogonal spreading codes such as Walsh codes are used, and also suggested general rules which make it possible to achieve downlink diversity. Although this patent has suggested a new method using the conventional space-time block codes, the method can merely achieve transmission diversity.

Also, there has been suggested a method that achieves transmission diversity in CDMA mobile communication using Space-Time Trellis Codes (STTC) rather than Space-Time Block Codes (STBC) and also increases the performance of the STTC by assigning one or more spreading codes to each user. This method is based on Orthogonal Plane Sequence Modulation (OPSM) that uses two or more orthogonal spreading codes rather than signal constellations.

This method is described in an article entitled "Space-time trellis-codes for high data rate wireless CDMA systems," IEE Electronic Letters, Vol. 39, No. 6, P. 541 to 543, Mar. 20, 2003.

This prior art has proposed new Space-Time Trellis Codes (STTC) by increasing the number of spreading codes per user to L, and also proposed a method for improving the performance of the STTC. Also, this prior art showed that the conventional space-time codes are applicable to Orthogonal Plane Sequence Modulation (OPSM), and further disclosed a new application of conventional space-time codes to the OPSM. However, this prior art still does not change the conventional space-time code design.

This prior art has an advantage in that coding gain is achieved through spread signals using OPSM and system adaptability is also improved by diversifying the demodulation method which makes it possible to implement a single data transfer rate. However, this prior art merely applies spread codes in a different manner under the assumption that the spread codes are orthogonal to each other. Thus, an efficient method for designing space-time codes has not yet been proposed.

DISCLOSURE

Technical Problem

Therefore, the present invention has been made in view of the above problems, and it is an advantage of the present invention to provide a diversity transmitting/receiving apparatus and method in a Code Division Multiple Access (CDMA) system using space-time codes, wherein the space-time codes are constructed from a Pseudo Noise (PN) sequence set rather than a dense signal constellation so that not only transmission diversity but also coding gain can be achieved even in the general case where random spreading codes are used.

It is another advantage of the present invention to provide a diversity transmitting/receiving apparatus and method, wherein space-time codes constructed from a set of relatively-long PN sequences are used in a Direct Sequence Code Division Multiple Access (DS/CDMA) system, thereby reducing multiple user interference.

Technical Solution

In accordance with one aspect of the present invention, the above and other objects can be accomplished by the provision of a transmitter in a Direct Sequence Code Division Multiple Access (DS/CDMA) system, the transmitter comprising a PN sequence generator for generating multiple Pseudo random Noise (PN) sequences; a space-time encoder for selecting two PN sequences from the multiple PN sequences to construct Space-Time Trellis Codes (STTC), and space-time encoding data received from a data source according to the space-time trellis codes to output an M-ary data symbol; first and second modulators for modulating the space-time encoded data according to the space-time trellis codes; and first and second multiple transmit antennas for wirelessly transmitting outputs of the first and second modulators, respectively.

Preferably, the PN sequence generator generates M/2+1 PN sequences for the space-time encoding.

Preferably, each data frame transmitted from the data source includes $\log_2 M$ bits for transmission of the M-ary data symbol.

Preferably, one bit of the $\log_2 M$ bits of the data frame is used to determine polarity of parallel transitions of inputs to the first and second modulators.

Preferably, the space-time encoder transmits the M-ary data symbol in each transmission, and selects two PN sequences from the multiple PN sequences to space-time encode $\log_2 M-1$ bits.

In accordance with another aspect of the present invention, there is provided a receiver in a Direct Sequence Code Division Multiple Access (DS/CDMA) system, the receiver comprising at least one receive antenna for receiving a space-time encoded signal through multiple paths; a plurality of received data processing units for despreading data received from each of the at least one receive antenna into a plurality of PN sequences, multiplying the PN sequences respectively by complex conjugates of fading coefficients, and taking real parts of the multiplied PN sequences; a plurality of adders for adding together signals output from the plurality of received data processing units; and a space-time decoder for decoding signals output from the plurality of adders.

Preferably, the receiver further comprises a baseband filter for down-converting the decoded data into baseband data.

Preferably, a signal $\gamma^j(t,\tau)$ output from a j-th receive antenna of a plurality of receive antennas at time t has a value obtained by adding noise to the sum of spread signals multiplied by fading gains corresponding to the j-th receive antenna, the signal $\gamma^j(t,\tau)$ being expressed by the following equation:

$$\gamma^j(t,\tau) = \sum_{i=1}^{n} \alpha_{i,j} c^i(t,\tau) + \eta^j(t,\tau),$$

where "$\tau(\epsilon 0, 1, \ldots, N-1)$" denotes chip time index where "N" denotes a PN sequence length, "$c^i(t,\tau)$" denotes an input to an i-th modulator, which is to be transmitted through an i-th transmit antenna after modulation, "$\alpha_{i,j}$" is a path gain from the i-th transmit antenna to the j-th receive antenna, and "$\eta^j(t,\tau)$" denotes noise at time t and at chip time $\tau$.

Preferably, the noise "$\eta^j(t,\tau)$" at time t and at chip time $\tau$ is modeled as a zero-mean complex Gaussian random variable with $E|\eta^j(t,\tau)|^2 = N_0$.

Preferably, the coefficient "$\alpha_{i,j}$" corresponds to independent fading undergone by a signal transmitted from the i-th transmit antenna to the j-th receive antenna, and is modeled as a zero-mean independent complex Gaussian random variable with $E|\alpha_{i,j}|^2 = 1$.

Preferably, each of the plurality of received data processing units comprises a demodulator for demodulating the received data; a plurality of first multipliers for multiplying an output signal of the demodulator respectively by corresponding spreading codes of the PN sequences; a plurality of accumulators for accumulating data output from the plurality of first multipliers over a PN sequence length, respectively; a plurality of second multipliers for multiplying output signals of the plurality of accumulators by complex conjugates of fading coefficients according to path gains; and a plurality of real part selectors for taking real parts of signals output from the plurality of second multipliers, respectively.

Preferably, the space-time decoder is a space-time Viterbi decoder that performs decoding using a branch metric.

Preferably, the branch metric is expressed by $$\sum_{j=1}^{m} \sum_{\tau=0}^{N-1} \left| \gamma^j(t,\tau) - \sum_{i=1}^{n} \alpha_{i,j} c^i(t,\tau) \right|^2,$$

and wherein the space-time Viterbi decoder searches for a path having a lowest accumulated metric.

Preferably, wherein, when correlation between the PN sequences is negligible, a highest value from among values expressed by $$\sum_{i=1}^{n} \sum_{j=1}^{m} \text{Re}\left\{ \alpha_{i,j}^* \sum_{\tau=0}^{N-1} \gamma^j(t,\tau) c^{i*}(t,\tau) \right\}$$

is calculated to simplify the branch metric.

In accordance with still another aspect of the present invention, there is provided a transmitting method in a Direct Sequence Code Division Multiple Access (DS/CDMA) system, the method comprising receiving data from a data source; generating multiple Pseudo random Noise (PN) sequences; selecting two PN sequences from the multiple PN sequences to construct Space-Time Trellis Codes (STTC); space-time encoding data received from the data source according to the space-time trellis codes to output an M-ary data symbol; and modulating each of the space-time encoded data according to the space-time trellis codes and wirelessly transmitting the modulated data.

Preferably, the generation of the multiple PN sequences includes generating M/2+1 PN sequences for the space-time encoding.

Preferably, the selection of the two PN sequences from the multiple PN sequences to construct the space-time trellis codes includes receiving $\log_2 M$ bits from the data source.

Preferably, the space-time encoding of the data received from the data source according to the space-time trellis codes includes selecting two PN sequences from the multiple PN sequences and space-time encoding $\log_2 M - 1$ bits.

Preferably, the modulation of each of the space-time encoded data according to the space-time trellis codes includes determining polarity of parallel transitions using one bit from among $\log_2 M$ bits and modulating each of the space-time encoded data according to the determination.

In accordance with yet another aspect of the present invention, there is provided a receiving method in a Direct Sequence Code Division Multiple Access (DS/CDMA) system, the method comprising receiving a space-time encoded signal through multiple paths; despreading the received signal into a plurality of PN sequences; multiplying the PN sequences respectively by complex conjugates of fading coefficients, and taking real parts of the multiplied PN sequences; combining signals of the real parts into a signal; and decoding the combined signal.

Preferably, the decoding of the combined signal is performed using a branch metric.

Advantageous Effects

According to the present invention, it is possible to achieve both diversity gain and coding gain by constructing space-time codes from a PN sequence set rather than a conventional dense signal constellation. In addition, space-time codes are changed to suit the characteristics of broadband CDMA mobile communication, thereby making it possible to achieve both transmission diversity and high coding gain. Further, according to the present invention, the conventional space-time codes in the conventional narrow band are changed, and a receiver structure, which can easily receive the changed codes, can be implemented.

When the conventional space-time codes are used, a dense modulation scheme must be used in order to increase the data transfer rate. However, according to the present invention, it is possible to achieve both diversity gain and coding gain by applying an STTC method to CDMA mobile communication. That is, it is possible to use a modulation method employing PN sequences, rather than the conventional dense modulation method, in CDMA communication since the PN sequences are available as an additional resource in CDMA communication. In addition, it is possible to reduce multiple user interference by increasing the PN sequence length, and also to achieve coding gain by designing space-time codes suitable for the increased PN sequence length.

BEST MODE

A diversity transmitting and receiving apparatus and method in a CDMA system using space-time codes according to embodiments of the present invention will now be described in detail with reference to the accompanying drawings.

A diversity transmitter and receiver in a Direct Sequence Code Division Multiple Access (DS/CDMA) system according to an embodiment of the present invention uses space-time codes that are constructed from a possible Pseudo Noise (PN) sequence set rather than in a conventional two-dimensional signal space. The present invention includes various design examples having other PN sequences and states, and methods that can be implemented according to the designs.

The present invention is characterized in that diversity gain is achieved in the DS/CDMA system using space-time coding modified as described later. The space-time codes are designed, if possible, using a PN sequence set to increase the number of PN sequences. The newly produced space-time codes improve the performance of the system.

The configuration and operation of a diversity transmitting and receiving apparatus in a CDMA system using space-time codes according to embodiments of the present invention will now be described in detail with reference to the drawings.

Figure 1:
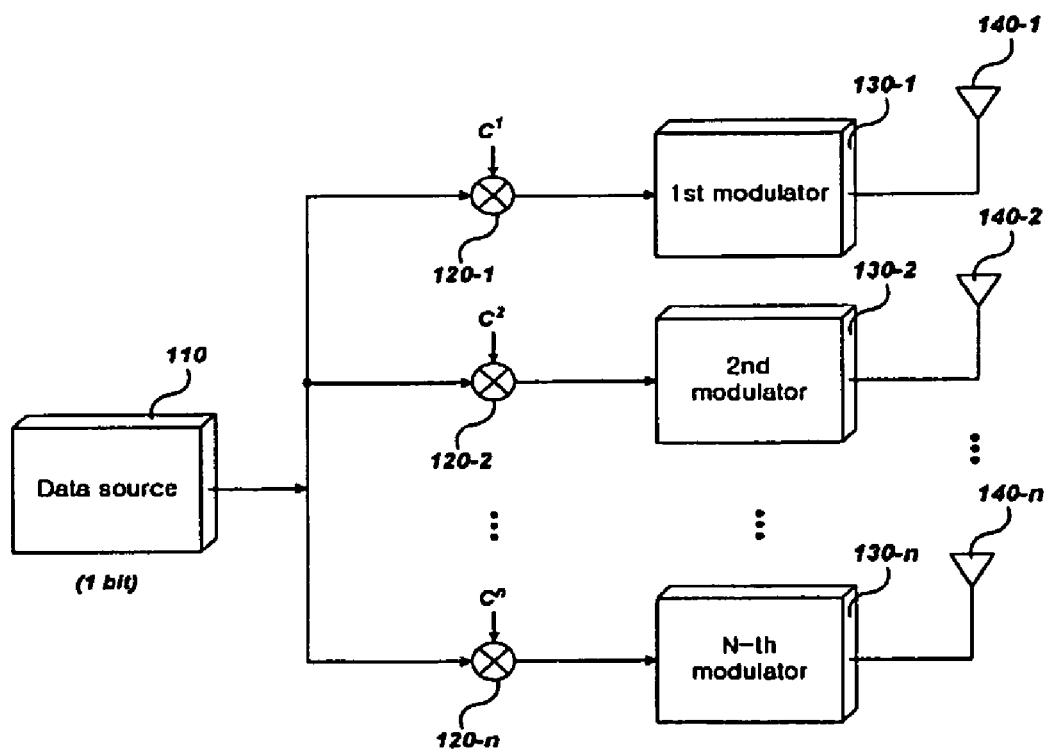
FIG. 1 is a block diagram of a conventional diversity transmitter.
Figure 2:
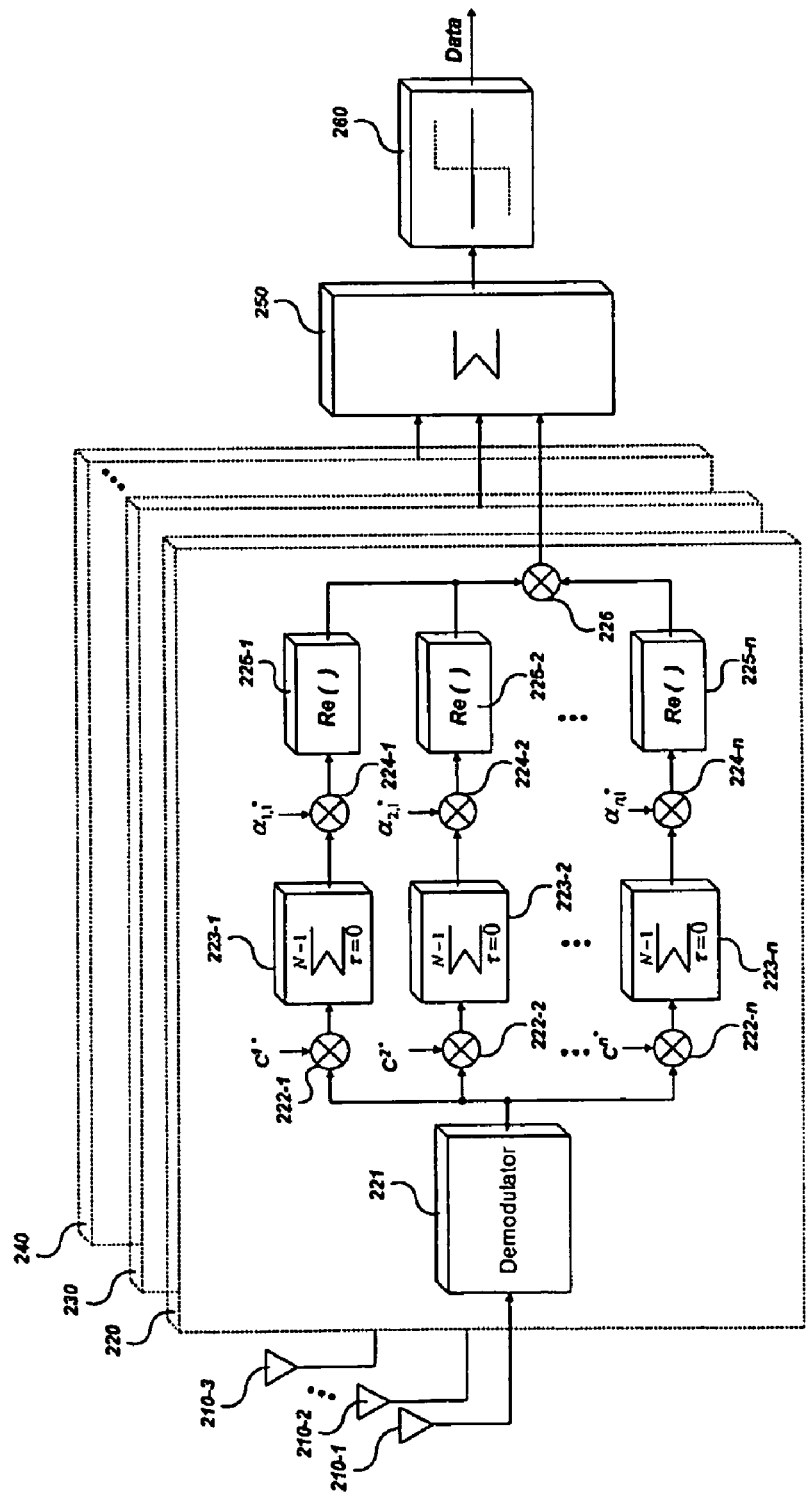
FIG. 2 is a block diagram of a conventional diversity receiver.
Figure 3:
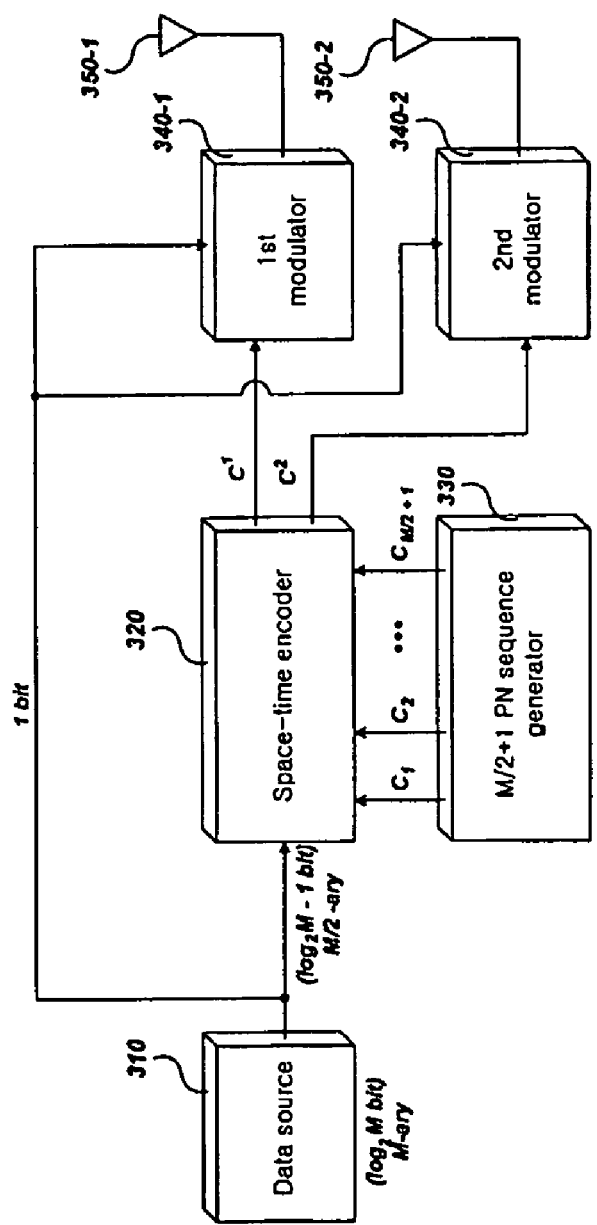
FIG. 3 is a block diagram of a diversity transmitter in a CDMA system using space-time codes according to an embodiment of the present invention.

FIG. 3 is a block diagram of a diversity transmitter in a CDMA system using space-time codes according to an embodiment of the present invention, where the diversity transmitter has two transmit antennas.

As shown in FIG. 3, the diversity transmitter in the CDMA system using space-time codes according to the embodiment of the present invention includes a space-time encoder 320, a Pseudo Noise (PN) sequence generator 330, first and second modulators 340-1 and 340-2, and first and second multiple transmit antennas 350-1 and 350-2. The PN sequence generator 330 generates multiple PN sequences. The space-time encoder 320 selects two PN sequences from the generated multiple PN sequences to construct Space-Time Trellis Codes (STTC). The space-time encoder 320 space-time encodes data received from a data source 310 according to the space-time trellis codes and outputs an M-ary data symbol. The first and second modulators 340-1 and 340-2 modulate the space-time encoded data according to the space-time trellis codes. The first and second multiple transmit antennas 350-1 and 350-2 wirelessly transmit outputs of the first and second modulators 340-1 and 340-2, respectively.

A diversity transmitting method in a CDMA system using space-time codes according to the present invention is performed in the following manner. Data is received from a data source, multiple PN sequences are generated, and two PN sequences are selected from the generated multiple PN sequences to construct space-time trellis codes (STTC). Thereafter, the data received from the data source is space-time encoded according to the space-time trellis codes to output an M-ary data symbol, and the space-time encoded data is modulated according to the space-time trellis codes, and the modulated data is then wirelessly transmitted.

In FIG. 3, the space-time encoder 320 in the transmitter according to the embodiment of the present invention is designed to transmit an M-ary data symbol rather than one bit in each transmission. One bit of the $\log_2 M$ bits is used to determine the polarity of parallel transitions. The $\log_2 M-1$ bits are used to select two PN sequences from $M/2+1$ PN sequences, and the two PN sequences are transmitted to the two transmit antennas, respectively.

Let us assume that it is desired to transmit $\log_2 M$ bits in the conventional system. For example, when the length of a PN sequence in the conventional diversity transmission system is $N_r$, chips, the conventional system must perform $\log_2 M$ transmissions. When the system according to the present invention has the same chip period as the conventional system and performs M-ary transmission, the system according to the present invention can transmit $\log_2 M$ bits via single transmission using PN sequences, the length of each of which is N ($=N_r \times \log_2 M$) chips. Consequently, the system according to the embodiment of the present invention is able to use a PN sequence longer than that of the conventional system even though it has the same bandwidth and data rate as those of the conventional system.

Figure 4:
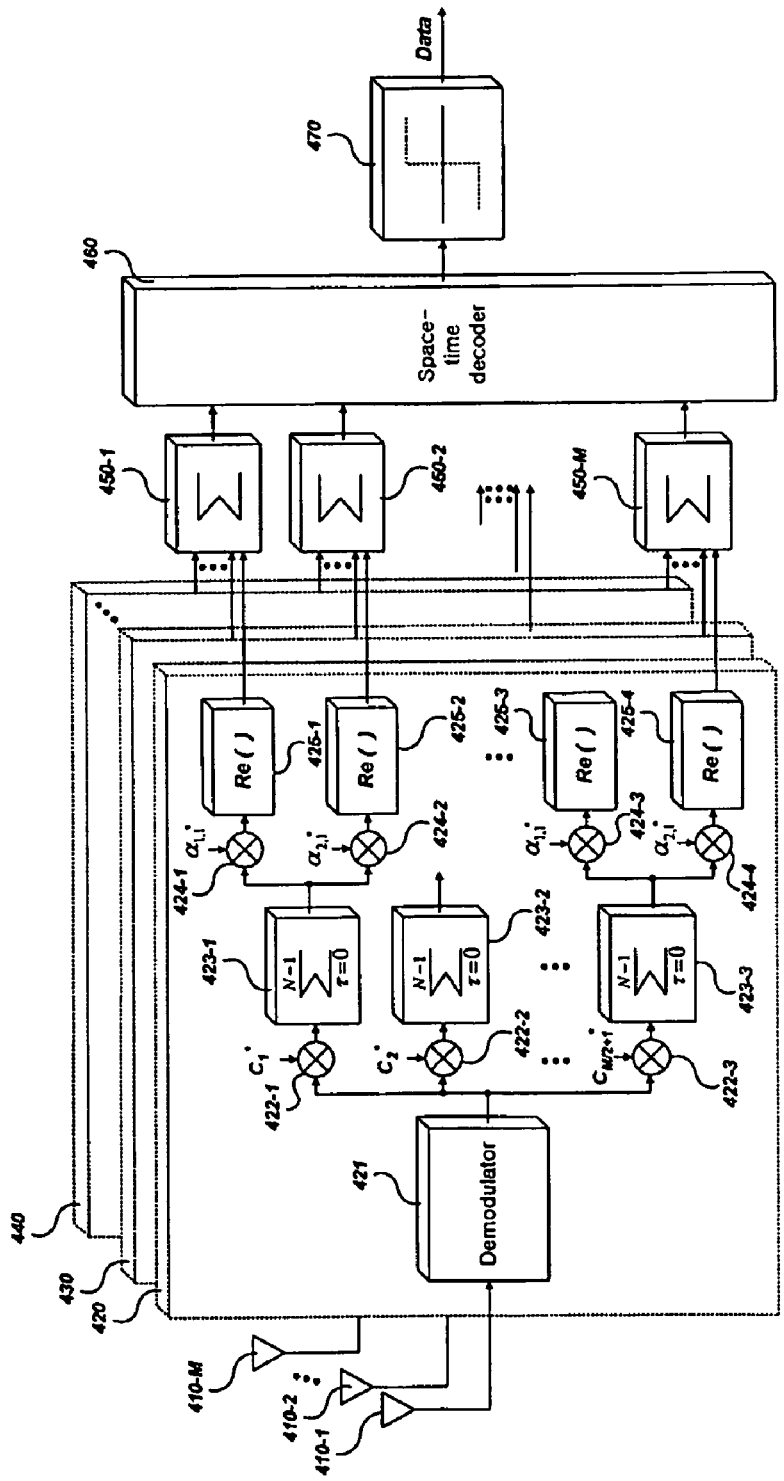
FIG. 4 is a block diagram of a diversity receiver in a CDMA system using space-time codes according to an embodiment of the present invention.

FIG. 4 is a block diagram of a diversity receiver in a CDMA system using space-time codes according to an embodiment of the present invention.

As shown in FIG. 4, the diversity receiver in the CDMA system using space-time codes according to the embodiment of the present invention includes one or more receive antennas 410-1, 410-2, . . . , and 410-M, a plurality of received data processing units 420, 430, . . . , and 440, a plurality of adders 450, 450-2, . . . , and 450-M, a space-time decoder 460, and a baseband filter 470. The at least one receive antenna 410-1 to 410-M receives space-time encoded signals through multiple paths. The plurality of received data processing units 420 to 440 despread data received from each receive antenna into a plurality of PN sequences. The plurality of received data processing units 420 to 440 multiply the PN sequences by complex conjugates of fading coefficients and then take the real parts of the multiplied PN sequences. Each of the plurality of adders 450-1 to 450-M adds together signals output from the plurality of received data processing units 420 to 440. The space-time decoder 460 decodes signals output from the plurality of adders 450-1 to 450-M. The baseband filter 470 baseband-filters the decoded data (i.e., down-converts the same into baseband data). For example, the diversity receiver according to the embodiment of the present invention is preferably a diversity receiver using two receive antennas.

Each of the plurality of received data processing units 420 to 440 includes a demodulator 421, a plurality of first multipliers 422-1, 422-2, . . . , and 422-3, a plurality of accumulators 423-1, 423-2, . . . , and 423-3, a plurality of second multipliers 424-1, 424-2, . . . , and 424-3, and a plurality of real part selectors 425-1, 425-2, 425-3, . . . , and 425-4. The demodulator 421 demodulates data received through the receive antenna. The plurality of first multipliers 422-1 to 422-3 multiply an output signal of the demodulator 421 respectively by corresponding spreading codes of the PN sequences. The plurality of accumulators 423-1 to 423-3 accumulate data output from the plurality of first multipliers 422-1 to 422-3 over the PN sequence length "N"

$$\sum_{\tau=0}^{N-1}),$$

respectively. The plurality of second multipliers 424-1 to 424-4 multiply output signals of the plurality of accumulators 423-1 to 423-3 by complex conjugates of fading coefficients according to path gains. The plurality of real part selectors 425-1 to 425-4 take the real parts of signals output from the plurality of second multipliers 424-1 to 424-4.

A diversity receiving method in a CDMA system using space-time codes according to the present invention is performed in the following manner. A space-time encoded signal is received through receive antennas via multiple paths. Data received from each of the receive antennas is despread into a plurality of PN sequences, respectively. The plurality of PN sequences are multiplied by complex conjugates of fading coefficients, respectively, and the real parts of the multiplied PN sequences are taken. The real parts are combined into a signal, and each combined signal is decoded.

As shown in FIG. 4, a signal output from a j-th antenna is input to a j-th demodulator in the diversity receiver in the CDMA system using space-time codes according to the embodiment of the present invention. The input signal is down-converted into a baseband through the demodulator 421.

The output $\gamma^j(t,\tau)$ of the j-th antenna at time t is expressed by Equation (1).

$$\gamma^j(t, \tau) = \sum_{i=1}^{n} \alpha_{i,j} c^i(t, \tau) + \eta^j(t, \tau), \quad (1)$$

where "$\tau(\epsilon 0, 1, \ldots, N-1)$" denotes chip time index where "N" denotes a PN sequence length, "$c^i(t,\tau)$" denotes an input to an i-th modulator, which is to be transmitted through an i-th transmit antenna after modulation, and "$\eta^j(t,\tau)$" is noise at time t and at chip time $\tau$, which can be modeled as a zero-mean complex Gaussian random variable with $E|\eta^j(t,\tau)|^2 = N_0$.

In Equation (1), the coefficient "$\alpha_{i,j}$" is a path gain from an i-th transmit antenna to a j-th receive antenna. The coefficient "$\alpha_{i,j}$" is modeled as a zero-mean independent complex Gaussian random variable with $E|\alpha_{i,j}|^2 = 1$. This modeling is based on the assumption that signals transmitted from different antennas undergo independent fading. The output $\gamma^j(t,\tau)$ of the j-th antenna at time t has a value obtained by adding noise to the sum of spread signals multiplied by respective fading gains corresponding to the j-th antenna.

According to an embodiment of the present invention, a branch metric for decoding the transmitted signal can be given by Equation (2).

$$\sum_{j=1}^{m} \sum_{\tau=0}^{N-1} \left| \gamma^j(t, \tau) - \sum_{i=1}^{n} \alpha_{i,j} c^i(t, \tau) \right|^2 \quad (2)$$

The space-time Viterbi decoder then searches for a path having the lowest accumulated metric. Minimization of Equation (2) is identical to maximization of Equation (3).

$$\sum_{j=1}^{m} Re \left\{ \sum_{i=1}^{n} \alpha_{i,j}^* \sum_{\tau=0}^{N-1} \gamma^j(t, \tau) c^{i*}(t, \tau) - \sum_{i,p<q}^{n} \alpha_{p,j} \alpha_{q,j}^* \sum_{\tau}^{N-1} c^p(t, \tau) c^{q*}(t, \tau) \right\} \quad (3)$$

Generally, the correlation between the PN sequences is negligible, so that different PN sequences are always assigned to the antennas in the space-time coding according to the embodiment of the present invention, and therefore Equation (3) can be simplified to Equation (4).

$$\sum_{i=1}^{n} \sum_{j=1}^{m} Re \left\{ \alpha_{i,j}^* \sum_{\tau=0}^{N-1} \gamma^j(t, \tau) c^{i*}(t, \tau) \right\} \quad (4)$$

The simplified space-time Viterbi decoder 460 in the system according to the embodiment of the present invention uses the simplified branch metric. Accordingly, after the received signal is despread into possible PN sequences according to the transmit antennas, the PN sequences are multiplied by complex conjugates of fading coefficients, and the sum of the real parts of the multiplied values over the transmit and receive antennas are used for the decoding.

Figure 5:
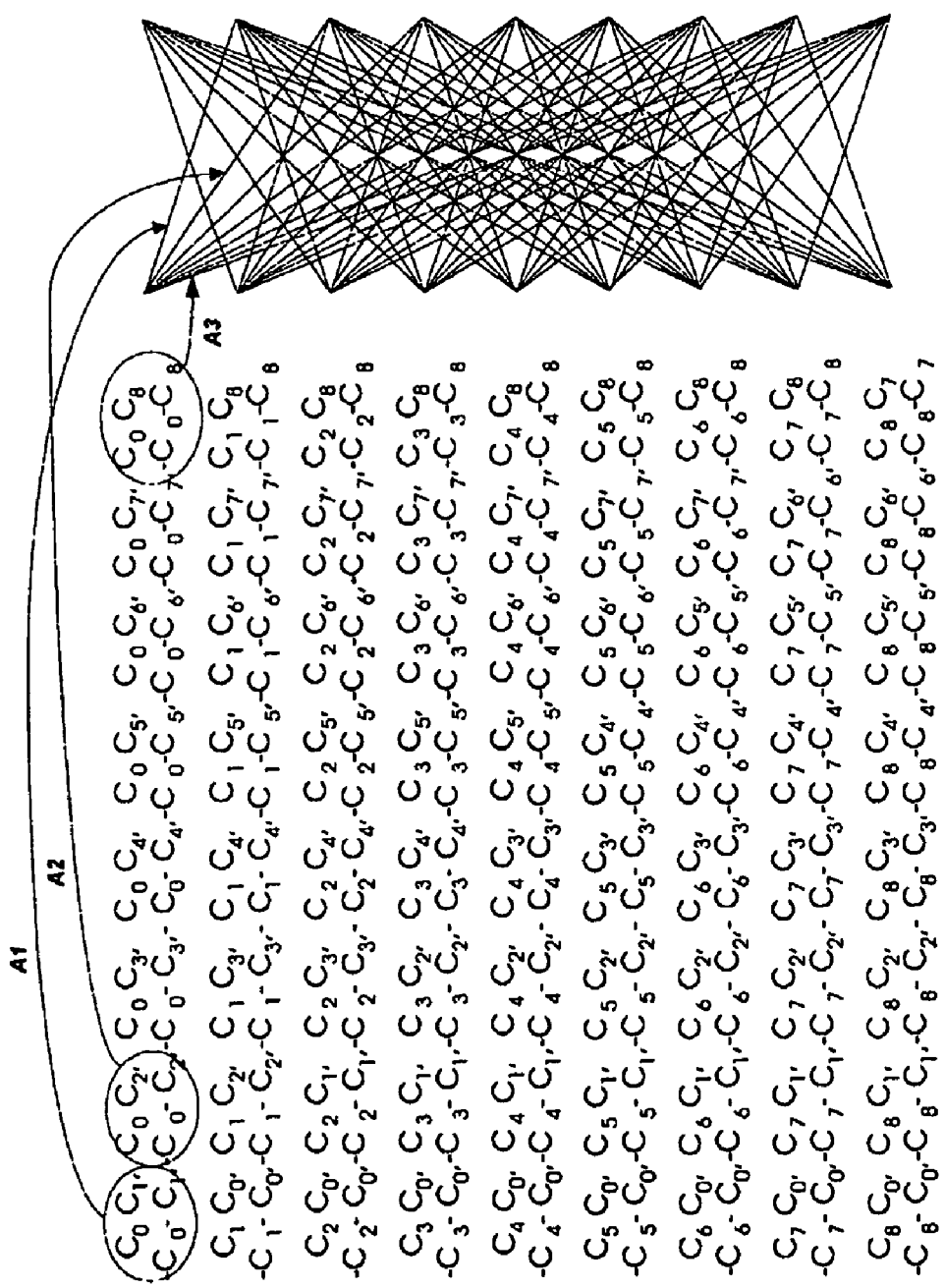
FIG. 5 is a diagram illustrating an example of space-time codes using 9 PN sequences according to an embodiment of the present invention.
Figure 6:
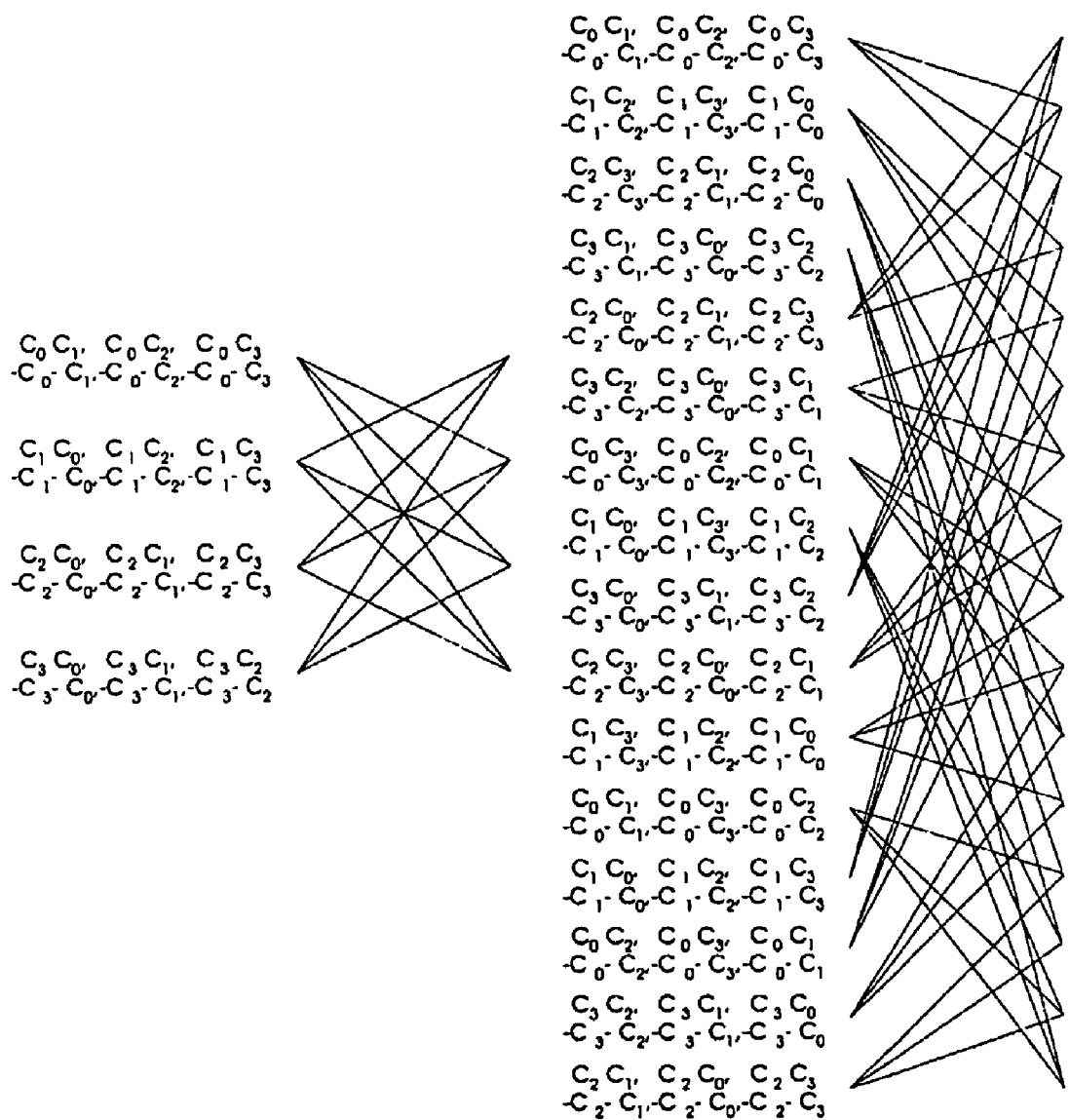
FIG. 6 is a diagram illustrating an example of space-time codes using 4 PN sequences according to an embodiment of the present invention.

FIG. 5 illustrates an example of space-time codes using 9 PN sequences according to the embodiment of the present invention, and FIG. 6 illustrates an example of space-time codes using 4 PN sequences according to the embodiment of the present invention.

The examples of FIGS. 5 and 6 are space-time codes when the number of transmit antennas is 2. In FIGS. 5 and 6, "C" denotes a PN code sequence, and the subscript denotes the index of the PN sequence. For M-ary transmission, each symbol "C" denotes one of the elements of a set $\{c_1, c_2, \ldots c_{M/2+1}\}$. The left symbol "C" is a PN sequence to be transmitted through the first transmit antenna, the right symbol "C" is a PN sequence to be transmitted through the second transmit antenna, and the subscript is the index of the PN sequence. In FIGS. 5 and 6, upper and lower PN sequences of each of two pairs of upper and lower PN sequences have positive and negative signs, respectively, indicating parallel transitions.

FIGS. 7, 8, 9 and 10 are graphs illustrating simulation results for comparison of the performance of the Direct Sequence Code Division Multiple Access (DS/CDMA) system according to the embodiment of the present invention with the performance of the conventional DS/CDMA system.

The simulations were performed under a slow, frequency-nonselective Rayleigh fading environment. That is, the simulations were performed under the assumption that the channel gain varies between frames but does not vary during one frame. Methods applied to provide the simulation results shown in the graphs of FIGS. 7 to 10 have the same bandwidth and the same information bit rate. When it is assumed that the modulation method used in the embodiment of the present invention is Quadrature Phase Shift Keying (QPSK) for downlink communication, fading gains of users are the same. In addition, PN sequences were always randomly generated in the simulations.

Figure 7:
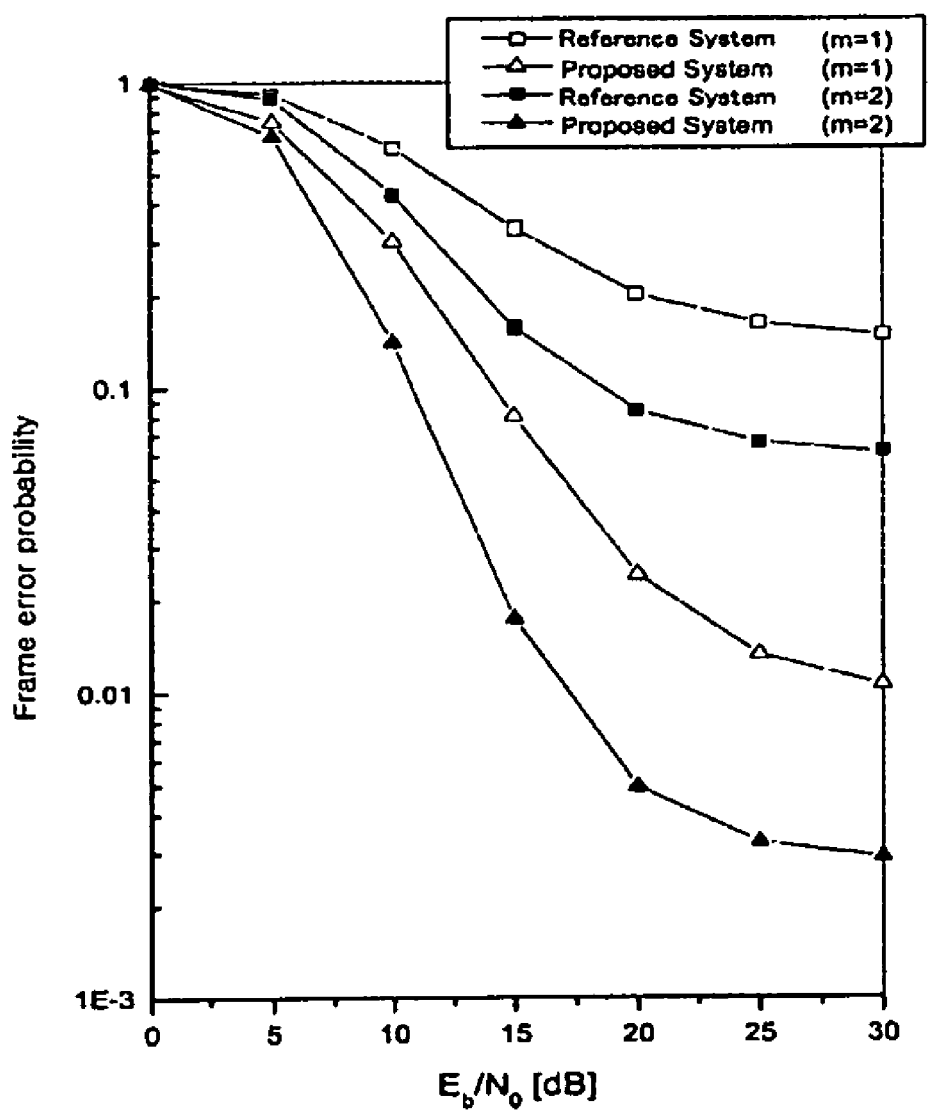
FIGS. 7 and 8 are graphs showing frame error probability and bit error probability in simulation results of a Direct Sequence Code Division Multiple Access (DS/CDMA) system according to the embodiment of the present invention and a conventional DS/CDMA system when the space-time codes shown in FIG. 5 are used.
Figure 8:
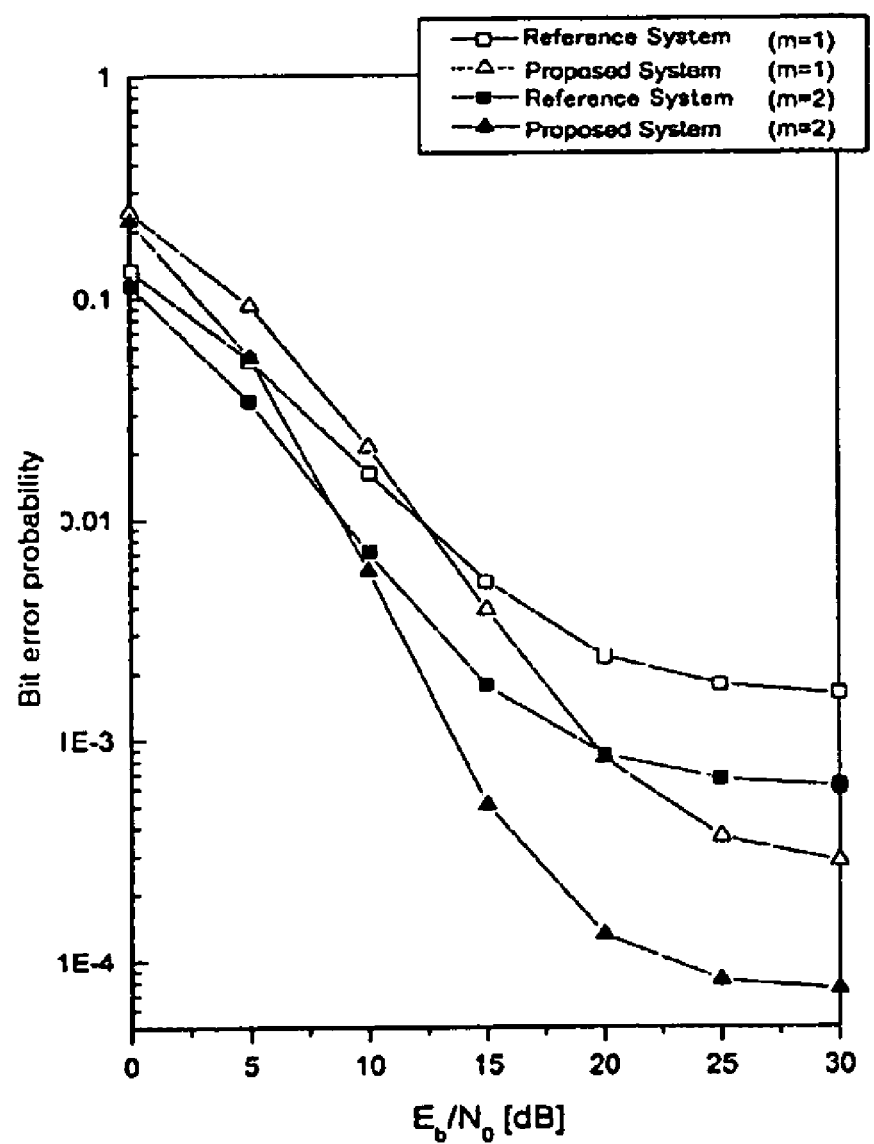

Specifically, FIGS. 7 and 8 show frame error probability and bit error probability in simulation results of the DS/CDMA system according to the embodiment of the present invention and the conventional DS/CDMA system when the space-time codes shown in FIG. 5 are used.

More specifically, FIGS. 7 and 8 show simulation results of the performance of the DS/CDMA system (shown as "proposed system") according to the embodiment of the present invention and the conventional DS/CDMA system (shown as "reference system") when one and two receive antennas are used and when there are K (=30) users and the frame length is 120 information bits. In these simulations, the input to the system according to the embodiment of the present invention is 16-ary ($\log_2 16=4$ bits/sequence), and the space-time codes shown in FIG. 5 are used.

The PN sequence length of the conventional system and the PN sequence of the system according to the embodiment of the present invention are 128 and 512, respectively. That is, the PN sequence length of the system according to the embodiment of the present invention is four times longer than that of the conventional system. Here, the two systems use the same bandwidth.

It can be seen from FIGS. 7 and 8 that the system according to the embodiment of the present invention shows higher performance than the conventional system, and the system performance improvement over the conventional system is more remarkable when two antennas are used.

Figure 9:
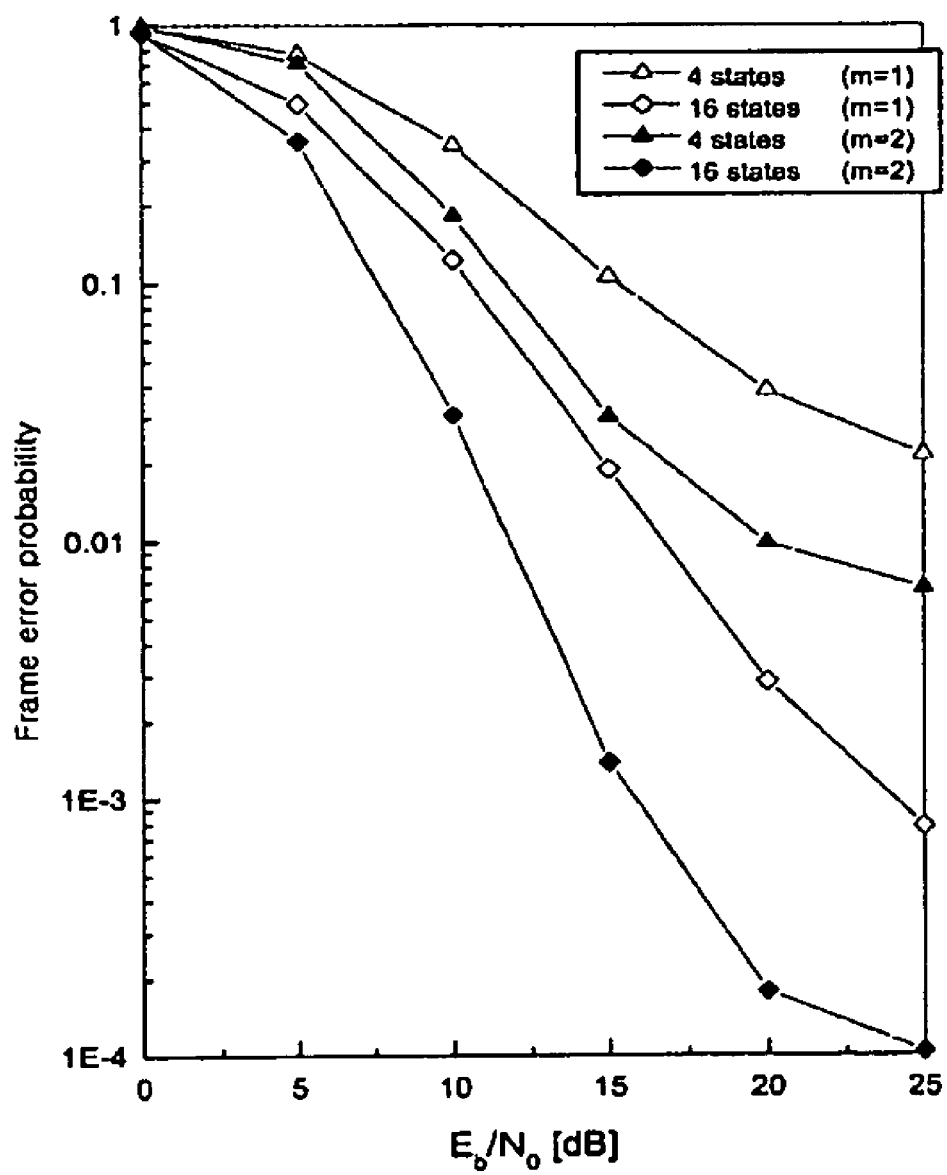
FIGS. 9 and 10 are graphs showing frame error probability and bit error probability in simulation results of the DS/CDMA system according to the embodiment of the present invention when the number of states of space-time codes varies as shown in FIG. 6.
Figure 10:
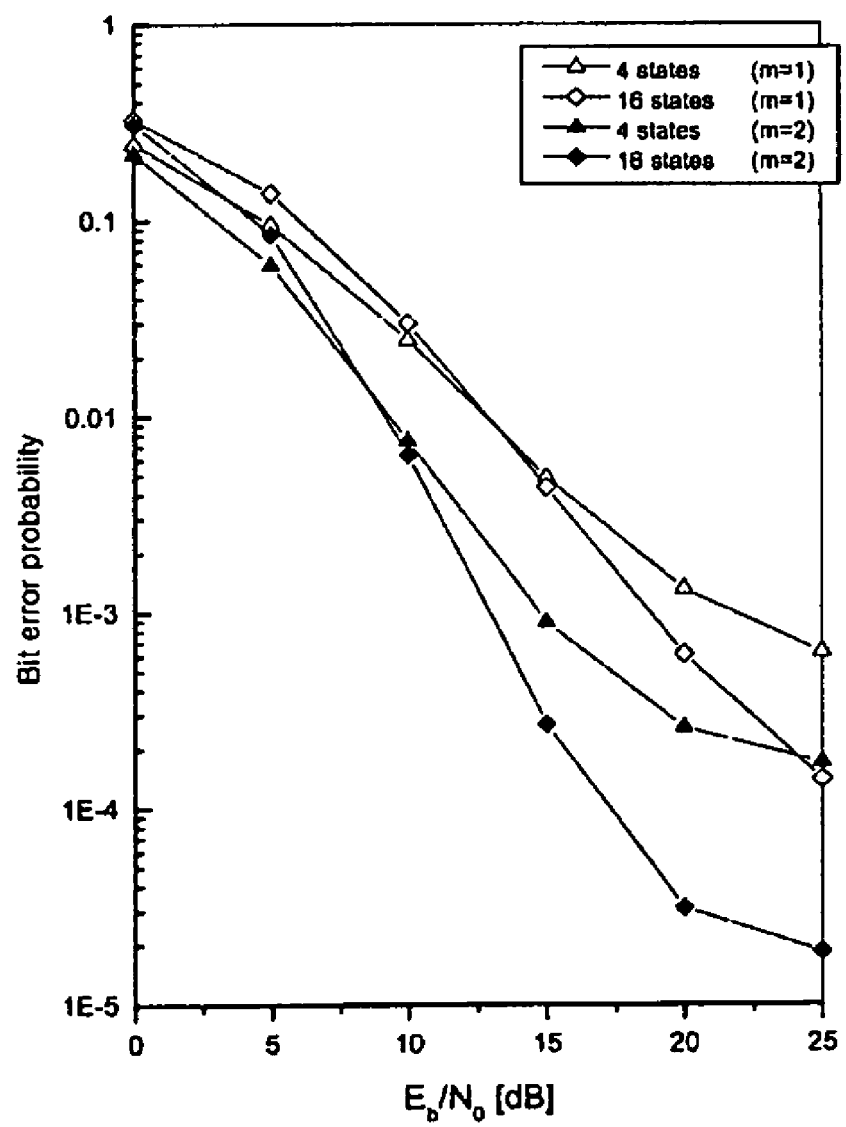

FIGS. 9 and 10 show frame error probability and bit error probability in simulation results of the system according to the embodiment of the present invention when the number of states of space-time codes varies as shown in FIG. 6. Specifically, FIGS. 9 and 10 show simulation results of the performance of a DS/CDMA system according to the embodiment of the present invention for different numbers of states of the space-time codes when there are K (=5) users and the frame length is 88 information bits. In these simulations, the input to the system according to the embodiment of the present invention is 6-ary, and the space-time codes shown in FIG. 6 are used. Here, the PN sequence length of the system according to the embodiment of the present invention is 64.

It can be seen from FIGS. 9 and 10 that the gain of the system according to the embodiment of the present invention when the number of space-time code states is 16 is much improved when two receive antennas are used.

The simulation results show that the system according to the embodiment of the present invention has higher performance than the conventional system, and the system performance improvement is more remarkable when two antennas are used.

As is apparent from the above description, a diversity transmitting/receiving apparatus and method in a Code Division Multiple Access (CDMA) system using space-time codes according to the present invention has the following advantages.

It is possible to achieve not only transmission diversity but also additional coding gain by applying a method based on space-time coding to a Direct Sequence Code Division Multiple Access (DS/CDMA) system. In addition, it is possible to reduce multiple user interference by increasing the length of a PN sequence.

Further, a method employing space-time trellis codes (STTC) of the CDMA system can be easily implemented with PN sequences so as to suit the characteristics of the CDMA system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A transmitter in a Direct Sequence Code Division Multiple Access (DS/CDMA) system, the transmitter comprising:
    a PN sequence generator for generating multiple Pseudo random Noise (PN) sequences;
    a space-time encoder for selecting two PN sequences from the multiple PN sequences to construct Space-Time Trellis Codes (STTC), and space-time encoding data received from a data source according to the space-time trellis codes to output an M-ary data symbol;
    first and second modulators for modulating the space-time encoded data according to the space-time trellis codes; and
    first and second multiple transmit antennas for wirelessly transmitting outputs of the first and second modulators, respectively.

2. The transmitter according to claim 1, wherein the PN sequence generator generates M/2+1 PN sequences for the space-time encoding and wherein M is an integer that corresponds to a total number of modulators such that M is at least 2.

3. The transmitter according to claim 1, wherein each data frame transmitted from the data source includes $\log_2 M$ bits for transmission of the M-ary data symbol and wherein M is an integer that corresponds to a total number of modulators such that M is at least 2.

4. The transmitter according to claim 3, wherein one bit of the $\log_2 M$ bits of the data frame is used to determine polarity of parallel transitions of inputs to the first and second modulators.

5. The transmitter according to claim 1, wherein the space-time encoder transmits the M-ary data symbol in each transmission.

6. The transmitter according to claim 1, wherein the space-time encoder selects two PN sequences from the multiple PN sequences to space-time encode $\log_2 M-1$ bits and wherein M is an integer that corresponds to a total number of modulators such that M is at least 2.

7. A transmitting method in a Direct Sequence Code Division Multiple Access (DS/CDMA) system, the method comprising:

receiving data from a data source;
generating multiple Pseudo random Noise (PN) sequences;
selecting two PN sequences from the multiple PN sequences to construct Space-Time Trellis Codes (STTC);
space-time encoding data received from the data source according to the space-time trellis codes to output an M-ary data symbol; and
modulating each of the space-time encoded data according to the space-time trellis codes and wirelessly transmitting the modulated data.

8. The transmitting method according to claim 7, wherein the generation of the multiple PN sequences includes generating M/2+1 PN sequences for the space-time encoding and wherein M is an integer that corresponds to a total number of modulators such that M is at least 2.

9. The transmitting method according to claim 7, wherein the selection of the two PN sequences from the multiple PN sequences to construct the space-time trellis codes includes receiving $\log_2 M - 1$ bits from the data source and wherein M is an integer that corresponds to a total number of modulators such that M is at least 2.

10. The transmitting method according to claim 7, wherein the space-time encoding of the data received from the data source according to the space-time trellis codes includes selecting two PN sequences from the multiple PN sequences and space-time encoding $\log_2 M - 1$ bits and wherein M is an integer that corresponds to a total number of modulators such that M is at least 2.

11. The transmitting method according to claim 7, wherein the modulation of each of the space-time encoded data according to the space-time trellis codes includes determining polarity of parallel transitions using one bit from among $\log_2 M$ bits and modulating each of the space-time encoded data according to the determination.

* * * * *